United States Patent Office 2,907,223
Patented Oct. 6, 1959

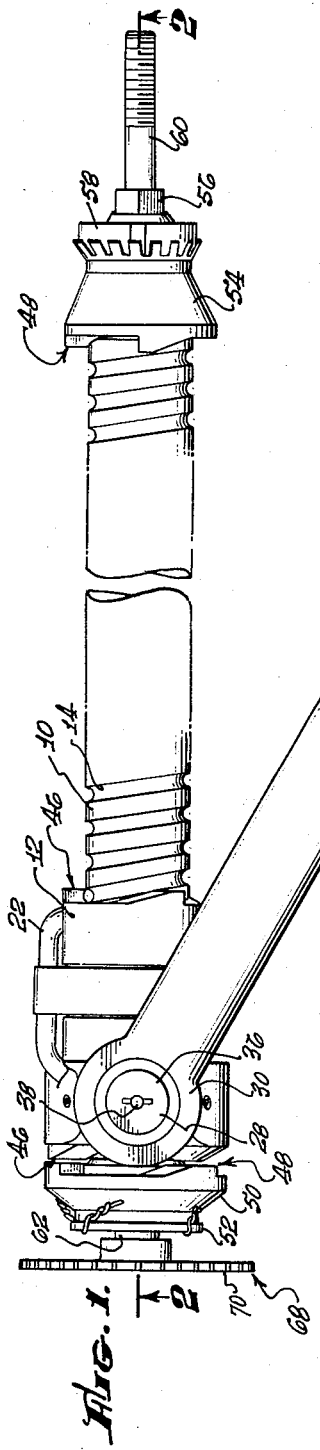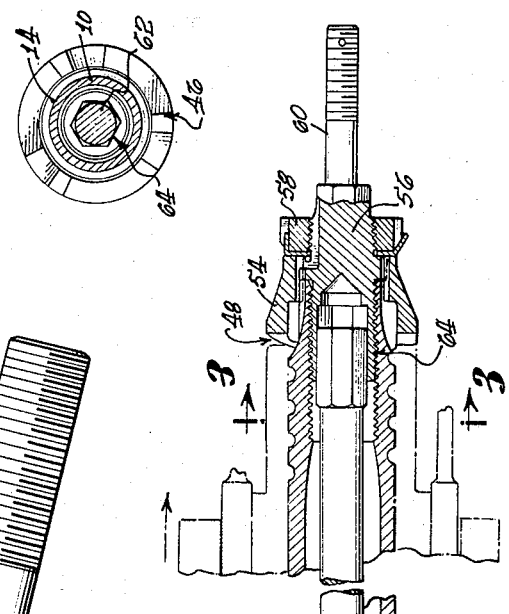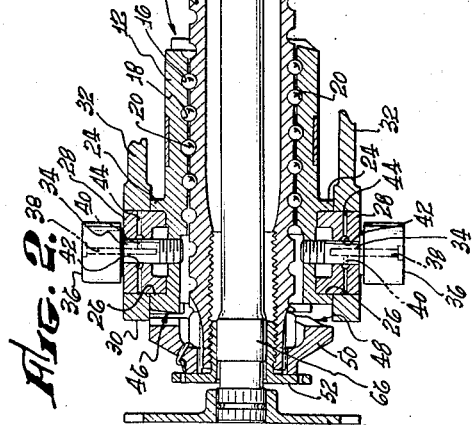

2,907,223

JACK SCREW DRIVE

Peter Valenti, Whittier, Calif., assignor to Sargent Engineering Corporation, Huntington Park, Calif., a corporation of California Application April 22, 1957, Serial No. 654,388

7 Claims. (Cl. 74—424.8)

The present invention relates in general to jack screws and, more particularly, to a jack screw drive incorporating means for absorbing any shocks resulting from movement of the nut of the jack screw to the ends of its travel, a primary object of the invention being to provide a jack screw drive of this nature.

Generally speaking, the invention contemplates a jack screw which includes a screw, a nut on the screw and movable axially therealong in response to rotation of the screw, axially inwardly facing stops at the respective ends of and carried by the screw, axially outwardly facing stops at the respective ends of and carried by the nut and respectively engageable with the stops on the screw to limit the travel of the nut, and means for rotating the screw to produce axial movement of the nut therealong, the apparatus or device to be operated by the jack screw being connected to the nut.

An important object of the invention is to provide a drive means for the screw which includes twistable means connected at one end to the screw and driven at its other end, whereby interengagement of one of the stops on the nut with the corresponding stop on the screw results in twisting of such twistable means to absorb any shock resulting from such stop interengagement.

Another object is to provide a jack screw of the foregoing nature having non-jamming, jaw-type stops which interengage without imposing axial loads on the nut, i.e., which apply circumferential loads only to the nut, the shock-absorbing, twistable means mentioned permitting the use of such stops.

More particularly, an object is to provide a twistable means which comprises a shaft coaxial with the screw and connected at one end to the screw, there being means for driving the other end of the shaft.

A further object is to provide a tubular screw and to provide a shock-absorbing, twistable shaft which is disposed within the screw and extends substantially the entire length thereof, one end of the shaft being keyed to the screw and the other end of the shaft being driven.

Another object is to provide a jack screw wherein the screw is a ball screw and the nut is a ball nut.

The foregoing objects, advantages, features and results of the present invention, together with various other objects, advantages, features and results thereof which will become apparent, may be attained with the exemplary embodiment of the invention illustrated in the accompanying drawing and described in detail hereinafter. Referring to the drawing:

Fig. 1 is a side elevational view of a jack screw which embodies the invention;

Fig. 2 is a longitudinal sectional view of the jack screw taken along the arrowed line 2—2 of Fig. 1; and Fig. 3 is a transverse sectional view taken along the arrowed line 3—3 of Fig. 2 of the drawing.

In the drawing, the numeral 10 designates a screw having thereon a nut 12. In the particular construction illustrated, the screw 10 is a ball screw and the nut 12 is a ball nut, the screw and the nut respectively having external and internal, matching helical grooves 14 and 16 which are semi-circular in cross section and which cooperate to provide between the nut and the screw a helical channel 18 of circular cross section which is filled with balls 20. As will be apparent, rotation of the screw 10 results in movement of the nut 12 axially thereof on the balls 20 in one direction or the other, depending upon the direction of rotation of the screw, the balls being transferred from one end of the channel 18 to the other through a transfer tube 22 as they reach one end of the channel or the other, this being a conventional structure.

The nut 12 is provided thereon with diametrically opposed, transverse bosses 24 having radial recesses 26 therein for bearings 28 on which eyes 30 of actuating arms 32 are journaled. These actuating arms may be connected to any suitable apparatus or device to be operated by the jack screw of the invention. The bearings 28 are retained in the recesses 26 by studs 34 threaded into the nut 12 and coaxial with the bearings 28. The studs 34 carry rollers 36 at their outer ends, these rollers being adapted to move in suitable tracks, not shown, and providing two points of support for the jack screw of the invention. A third point of support therefor is provided in a manner to be described.

It will be noted that the studs 34 are provided with axial lubricant passages 38, these passages communicating adjacent their inner ends with radial passages 40 in the studs. The outer ends of the radial passages 40 communicate with internal annular grooves 42 in the bearings 28, and these grooves communicate with the inner ends of radial ports 44 which supply lubricant to the interfaces between the bearings 28 and the eyes 30.

The nut 12 is provided at its ends with axially outwardly facing stops 46 which are respectively engageable with axially inwardly facing stops 48 at the ends of the screw 10 as the nut reaches the ends of its axial travel along the screw in response to rotation of the screw. In the structure shown, each of the stops 46 and 48 includes three jaws spaced apart circumferentially by 120 degrees and having jaw surfaces paralleling the screw axis. In effect, each stop 46 and the corresponding stop 48 cooperate to provide a non-jamming jaw-type clutch, which limits the axial travel of the nut 12 with accuracy and which does not impose any axial thrust load on the nut requiring the application of a back-off torque to overcome, but which does tend to introduce shock into the drive for the screw 10. This drive and the manner in which the invention absorbs such shock will be considered hereinafter.

The stop 48 at one end of the screw 10 is provided by a member 50 which is splined on the screw and which is retained by a flanged member 52 threaded into the screw 10. The stop 48 at the other end of the screw 10 is provided by a member 54 which is splined on the screw 10 and on a member 56 threaded into the screw 10. The member 54 is retained by a nut 58 threaded onto the member 56. Extending axially from and integral with the member 56 is a shaft 60 on which a thrust bearing, not shown, may be mounted to provide the aforementioned third point of support for the jack screw of the invention.

Considering the manner in which the jack screw of the invention is driven, coaxial with and disposed within the screw 10, which is tubular, is a shaft 62 extending substantially the entire length of the screw. The screw 10 is keyed to one end of the shaft 62 so that rotation of shaft is communicated through the screw. This is shown as accomplished by a keying means 64, or equivalent, connecting one end of the shaft 62 to the member 56, which is keyed to the screw 10 through the member 54 in the manner hereinbefore described. The shaft is journaled in the member 52 adjacent its other end, being provided with a bearing portion 66 for this purpose. The bearing portion 66 of the shaft 62 is rotatable within the member 52, and is also movable axially thereof in response to shortening and lengthening of the shaft resulting from twisting and untwisting thereof.

The shaft 62 projects axially outwardly from the screw 10 at the unkeyed end of the shaft and is provided with a drive means 68 thereon, this drive means being shown as comprising a sprocket 70 splined on the shaft.

Considering the operation of the invention, rotation of the sprocket 70 results in rotation of the shaft 62 and consequent rotation of the screw 10 to produce axial movement of the nut 12 along the screw in one direction or the other, depending upon the direction of screw rotation. As the nut 12 approaches one end of the screw 10, the jaws of the corresponding stop 46 on the nut suddenly engage the jaws of the corresponding stop 48 on the screw without the application of any axial load to the nut, the pitch of the grooves 14 and 16 being such that the jaws of the stops 46 on the nut move from positions just clearing the jaws of the stops 48 on the screw to positions fully engaging such stops in one-third of a revolution of the screw for the three-jaw stops disclosed. When one of the stops 46 engages the corresponding stop 48 in this fashion, the resulting shock is absorbed by twisting of the shaft 62 between the keying means 64 and the sprocket 70. Thus, the shocks resulting from arrival of the nut 12 at the ends of its travel are not fed back to the driving means connected to the sprocket 70, which is the important feature of the invention.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In combination: a screw; a nut on said screw and movable axially therealong in response to rotation of said screw; interengageable stops on said nut and said screw for limiting axial movement of said nut along said screw; elongated twistable means connected at one end to said screw; and drive means connected to the other end of said twistable means, whereby interengagement of said stops results in twisting of said twistable means to absorb any shock resulting from interengagement of said stops.

2. In combination: a screw member; a nut member on said screw member, relative rotation of said members producing relative axial movement thereof; interengageable stops on said members to limit relative axial movement thereof; elongated twistable means connected at one end to one of said members to produce relative rotation of said members and consequent relative axial movement thereof; and means for driving the other end of said twistable means, whereby interengagement of said stops results in twisting of said twistable means to absorb any shock resulting from interengagement of said stops.

3. In combination: a screw; a nut on said screw and movable axially therealong in response to rotation of said screw; interengageable stops on said nut and said screw for limiting axial movement of said nut along said screw; a shaft coaxial with said screw; means keying one end of said shaft to said screw; and drive means connected to the other end of said shaft, whereby interengagement of said stops results in twisting of said shaft to absorb any shock resulting from interengagement of said stops.

4. In combination: a tubular screw; a nut on said screw and movable axially therealong in response to rotation of said screw; interengageable stops on said nut and said screw to limit axial movement of said nut along said screw; a shaft coaxial with said screw, said shaft being disposed within said screw and extending substantially the entire length thereof; means keying one end of said shaft to said screw; and drive means connected to the other end of said shaft, whereby interengagement of said stops results in twisting of said shaft to absorb any shock produced by interengagement of said stops.

5. In combination: a tubular screw; axially inwardly facing stops at the respective ends of and carried by said screw; a nut on said screw and movable axially therealong in response to rotation of said screw; axially outwardly facing stops at the respective ends of and carried by said nut and respectively engageable with said stops on said screw to limit movement of said nut along said screw; a shaft coaxial with said screw, said shaft being disposed within said screw and extending substantially the entire length thereof; means keying one end of said shaft to said screw; and drive means connected to the other end of said shaft, whereby interengagement of one of said stops on said nut with one of said stops on said screw results in twisting of said shaft to absorb any shock resulting from such stop interengagement.

6. The combination set forth in claim 5 wherein said screw is a ball screw and said nut is a ball nut.

7. The combination of claim 1 wherein said stops are non-jamming, jaw-type stops having jaws provided with interengageable surfaces parallel to the axis of said screw.

References Cited in the file of this patent

UNITED STATES PATENTS

| | | |
|---|---|---|
| 1,260,080 | Singer | Mar. 19, 1918 |
| 2,409,288 | Le Land | Oct. 15, 1946 |
| 2,507,946 | Waeber | May 16, 1950 |
| 2,590,251 | Hoover | Mar. 25, 1952 |
| 2,714,821 | Orner | Aug. 9, 1955 |
| 2,734,359 | Mulheim et al. | Feb. 14, 1956 |
| 2,743,623 | Wells | May 1, 1956 |

FOREIGN PATENTS

| | | |
|---|---|---|
| 779,420 | Great Britain | July 17, 1957 |
| 1,123,355 | France | June 11, 1956 |